United States Patent Office 3,226,941
Patented Jan. 4, 1966

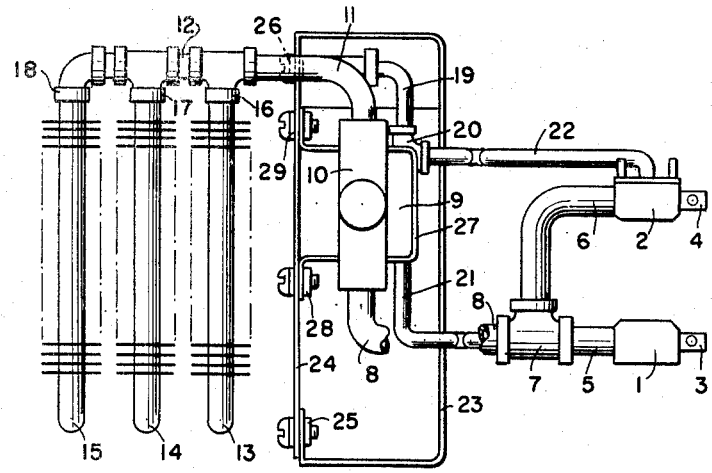
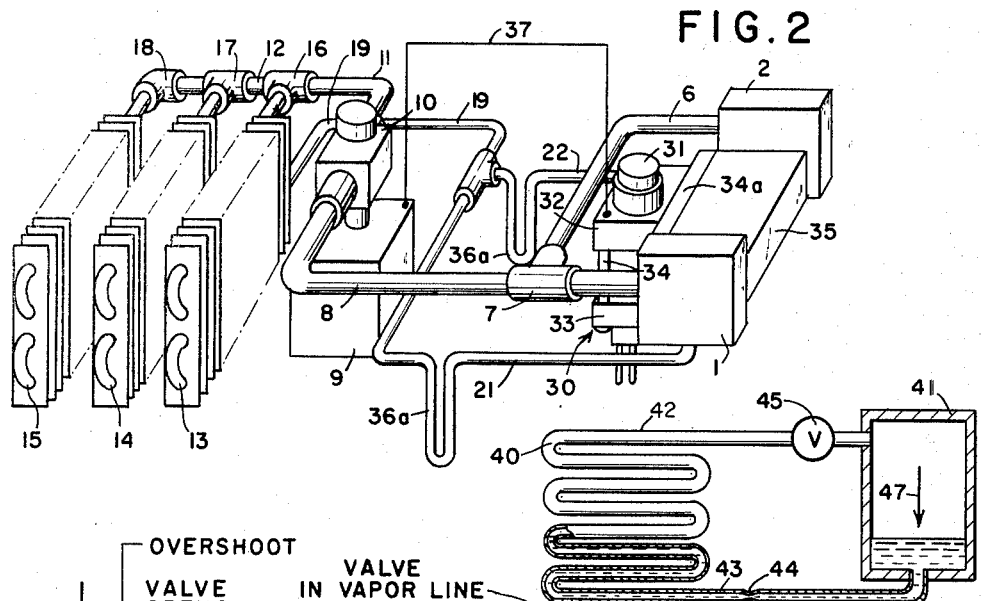
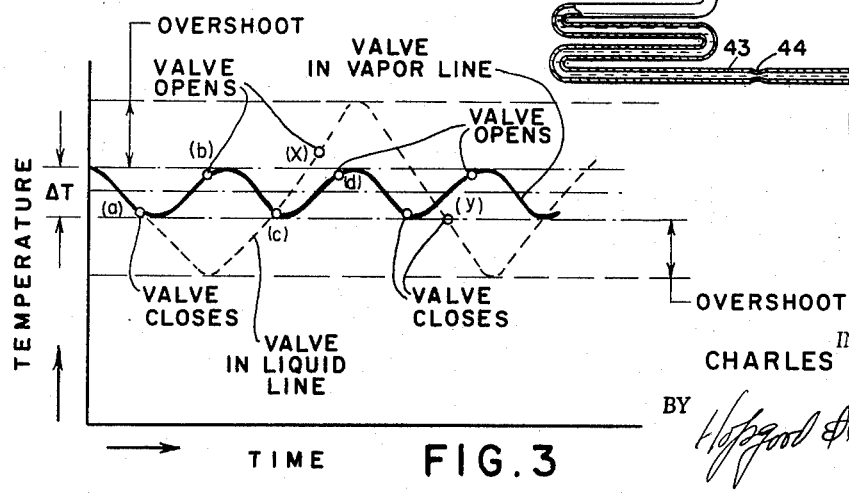

3,226,941
KLYSTRON COOLING SYSTEM ASSEMBLY
Charles D. Snelling, 2949 Greenleaf St., Allentown, Pa.
Filed Oct. 31, 1963, Ser. No. 320,313
3 Claims. (Cl. 62—217)

This invention relates to an assembly for controlling the temperature of a temperature-sensitive device and of assuring the optimum performance thereof over a controlled narrow temperature range with minimum thermal inertia or hysteresis and, in particular, to a self-operating cooling system assembly for use in association with a klystron tube.

Microwave tubes, such as klystrons, employed in modern communication systems should exhibit optimum frequency stability, long life, and low distortion. Klystron tubes are made in various configuration and sizes. The tube is the source of microwave energy which is fed into a tuned electronic circuit and while klystrons are usually designed to meet rigorous standards, in operation they generate a great deal of heat which is undesirable for several reasons. Excessive high temperatures shorten the life of the tube and cause frequent burn-out and it is, therefore, necessary to dissipate the heat to keep the temperature at the desired level to prolong the life of the tube. For a tube operating at about 220° F., close control at ±2° F. is desirable, particularly where it is essential to avoid as much as possible variations in tube output. The frequency that is generated by the tube is a function of the internal physical configuration of the tube which is precisely controlled during its manufacture. Temperature variations of the tube body itself tend to cause thermal expansion and contraction of the tube resulting in variations in output. Without temperature control, such variations would have to be compensated for by continuous adjustments of the other components of the system. Close temperature control, therefore, results in constant output of the tube which is particularly important under conditions of varying ambient temperatures. One technique used is to employ heat exchange means in combination with the electronic device such as metal fins which are exposed to the ambient environment. However, such means are limited by the prevailing ambient conditions.

In my copending application Serial No. 110,523, filed May 16, 1961, now Patent No. 3,112,890, I disclose a spot-cooling device for use with a fluoroescent vapor lamp fixture for controlling the vapor pressure of mercury within the lamp and hence lamp efficiency. The device there used comprises in combination with the vapor lamp fixture an evaporator mounted within the lamp housing in heat conductive relationship with the vapor lamp, a condenser mounted on the outside of the housing coupled to the evaporator via a liquid line and a vapor line, and a valve in the liquid line operated thermostatically in accordance with the temperature desired at the spot being cooled. When the tube portion at the spot overheat, the valve in the liquid line operates to feed heat-transfer liquid, e.g. Freon, to the evaporator in contact with the lamp where the liquid evaporates and spot cools the lamp portion by virtue of its latent heat of vaporization which removes heat from the spot. As the spot cools, mercury vapor within the vapor lamp condenses at the cool spot, thereby causing a drop in vapor pressure within the lamp to the desirable optimum operating level.

The foregoing cooling system, while adequate for fluorescent vapor lamps, has its limitations when applied to controlling the temperature of electronic components, such as the klystron tube, or other non-vapor devices, due to thermal inertia or hysteresis in the system, which generally results in some temperature variation outside the desired mean temperature which has a varying affect on the output of the component.

I have now found that I can overcome the foregoing difficulties by means of a novel combination of elements which enables the system to respond substantially immediately to temperature variations or fluctuations at or within the temperature-sensitive device or instrument with a minimum of thermal insertia or hysteresis.

It is accordingly one object of my invention to provide a self-operating temperature control system for use with delicate and sensitive devices which tend to be adversely affected by variations in operating temperatures.

Another object is to provide a self-operating temperature control system for controlling the temperature of electronic components, such as klystron tubes and the like, while at the same time minimizing thermal inertia or hysteresis.

A still further object is to provide the combination of a temperature-sensitive device and a temperature control system characterized by minimum thermal hysteresis.

These and other objects will be clearly apparent when taken in conjunction with the following disclosure and the accompanying drawings, wherein:

FIG. 1 illustrates in plan view one embodiment of a temperature control assembly adapted for use with a klystron tube and similar electronic devices;

FIG. 2 is a temperature control assembly similar to that of FIG. 1, but shown generally in perspective, illustrating, by way of example, how the assembly provided by the invention can be used in conjunction with a klystron tube or other similar electronic device;

FIG. 3 is illustrative of the type of temperature control obtained with the assembly of the invention as compared to an assembly outside the invention; and FIG. 4 is a diagrammatic representation of the operation of the invention.

Stating it broadly, my invention provides a temperature control assembly for controlling the temperature of devices, the performance of which is affected by temperature variations encountered during operation of the devices. Examples of devices with which my invention can be employed are gyroscopes and other temperature sensitive instruments; and electronic devices including klystrons, electric oscillators for use in generating high frequencies, devices for generating electromagnetic waves and the like.

I find my invention is particularly applicable in controlling the temperature of klystrons, the output of which is affected by variations in temperature arising in the device. With my device I am able to assure optimum performance over a narrow temperature range of control with minimum thermal hysteresis. In its broad aspect, the assembly provided by my invention comprises an evaporator adapted to be mounted in a device, the performance of which is affected by temperature variations prevailing under operational conditions, a condenser coupled to said evaporator via a liquid transfer line and a vapor transfer line, said condenser being in gravity feeding relationship to said evaporator via the liquid line which is connected from the condenser to a bottom portion of said evaporator, and a thermostatically operable valve mounted in said vapor line.

Referring to FIG. 1, I show in plan view a preferred embodiment of my invention comprising a pair of evaporator segments 1, 2 having extending from the bottom thereof, respectively, mounting means 3, 4, said segments each having a vapor transfer line 5, 6, respectively, extending from the top of the evaporator segments and merging with each other via a pipe T7 to form a single vapor transfer line 8 which passes through a solenoid operated valve 9 through valve connection 10 and from thence via line 11 to manifold or header 12 which feeds into a parallel grouping of fin-cooled condensers 13, 14 and 15 via pipe T's 16, 17 and elbow 18. The vapor condensed and collected at the bottom of the condensers is fed back to evaporator segments 1, 2, via line 19 which is divided by pipe T20 into two paths of flow via pipe lines 21, 22, which pipe lines enter segments 1 and 2, respectively, at the bottoms thereof (not FIG. 2).

A framework for rigidly supporting the valve is provided comprising a U-shaped bracket member 23 and a plate 24 secured thereto via screws 25 and 26. Within the framework, a valve bracket 27 is provided for securely mounting valve body 9 to the framework via screws 28 and 29.

The general arrangement of the parts is shown in the perspective view of FIG. 2 except that the framework supporting the valve and other components has been deleted for purpose of clarity. Like parts have been given the same numeral designations. In addition, the arrangement of evaporator segments 1, 2 is shown relative to a device 30 the temperature of which it is desired to control. In this instance the device illustrated is a klystron tube 31 which passes through a pair of separated metal plates 32, 33, held in that position by securing means 34, the lower portion of the tube extending through plate 33 as shown so as to be free for plugging into an electronic circuit. The plates have associated therewith a metal flange 34a which is heat conductively connected by means (not shown) to a heat conductive block 35 the opposite sides of which are in heat conductive contact with evaporator segments 1 and 2 as shown in FIG. 2. A well or trap 36 may be provided in liquid line 21 (and 36a as in line 22). In its preferred aspect, the condenser may have a reservoir at the bottom thereof to hold liquid during the off cycle. As stated hereinbefore, the valve 9 may be a thermostatically operable solenoid valve thermostatically coupled via line 37 to the klystron assembly in the conventional manner.

The system defined by the liquid and vapor lines and the condenser and evaporator coupled thereto contains a thermodynamic fluid, e.g., Freon, which is hermetically sealed therein. As will be apparent from FIG. 2, the arrangements of the elements are such that vapor formed in evaporator segments 1, 2 passes through pipe lines 5 and 6 and merges into single line 8 which passes through valve 9 (if it is open), then to condensers 13, 14 and 15 where the vapor is condensed and then by gravity back to the evaporator via pipe lines 19, 21 and 22. The liquid line running between the condenser and evaporator must be so constructed that both gas and liquid cannot pass through it simultaneously in opposite directions. This may be accomplished by sizing the line so that gas cannot go one way and liquid the other, or by having a construction in the line or a trap in the liquid line. The liquid reservoir formed in the condenser should be as high or higher than the evaporator.

By utilizing the combination of elements shown in FIG. 2, thermal inertia or hysteresis is maintained at a minimum. Assuming the temperature of the klystron tube has increased and the valve has opened, the operation of the system proceeds as follows:

Heat transfer liquid flows into each segment of the evaporator which is at a higher temperature than the condenser. The liquid evaporates or boils and the vapor formed leaves the evaporator via lines 5 and 6, flows through valve 9 and into condensers 13 to 15 where it condenses and gives off its latent heat to the ambient environment by means of the cooling fins. The cooling cycle continues until the temperature of the tube reaches the desired level whereupon the thermostatically operable valve in the vapor line closes. With the vapor blocked off, it provides a backward pressure by virtue of the heat absorbed during boiling which acts immediately upon any residual liquid in the evaporator and forces it out of the two segments through lines 21 and 22 on back to the condenser. With no liquid in the evaporator, cooling ceases and the temperature held at the desired level until it begins to rise again whereby the thermostatically operable valve re-opens and starts the cycle over again.

The system is shown diagrammatically in FIG. 4 which depicts condenser 40 coupled to evaporator 41 via vapor line 42 and liquid line 43, a constriction 44 instead of a trap being preferably provided in the line 43. A valve 45 is shown in vapor line 42 and a level of liquid 46 in evaporator 41 and in the condenser. As will be apparent, when valve 45 is closed, there is no place for the vapor to escape. Thus, due to increase in vapor pressure, a force 47 is applied by the heated vapor to liquid 46 as shown, whereby the liquid is immediately expelled from the evaporator through liquid line 43 thereby interrupting the heat transfer. Had the valve been placed in the liquid line instead as is conventionally the practice, the cut-off would not be as rapid. For example, assuming valve 45 to be in line 43, at the moment the valve is shut off at the desired temperature $T_1$, a level of residual liquid 46 would exist in the evaporator. As will be apparent, the liquid will continue to boil giving off vapors passing through line 42 which removes additional heat from the electronic device thereby lowering the temperature still further to the undesired level $T_2$.

The net effect of the foregoing will clearly appear from FIG. 3 which shows the variation of temperature with time obtained with the invention with the valve in the vapor line as compared with the results obtained with the valve in the liquid line. The temperature-time curve in solid line illustrates the close control obtained with the invention as compared with the larger fluctuation shown by the curve (outside the invention) depicted in dotted line. Referring to the solid line curve, as the valve in the vapor line closes at the lower temperature range ($a$), the liquid is immediately expelled from the evaporator whereupon the temperature is held at ($a$) or begins to rise before dropping any further. When the rising temperature reaches ($b$), the valve in the vapor lines opens, whereby fluid in the liquid line immediately enters the evaporator to initiate the cooling effect; and so on through points ($c$), ($d$), etc., of the cycle.

On the other hand, referring to the dotted line curve resulting from the valve in the liquid line, a larger temperature variation results. For example, as the valve closes at ($a$), residual liquid remains in the evaporator causing further increase cooling effect as shown in FIG. 3 until all the residual liquid has been evaporated after which the temperature begins to rise until it reaches ($x$) where the valve opens. Because the valve in the liquid line sets up an initial resistance to flow, the flow of liquid to the evaporator is delayed and thus the temperature overshoots beyond ($x$) until sufficient liquid reaches the evaporator to cool it. As the liquid boils, the temperature drops to ($y$) and the cycle is repeated accompanied by thermal hysteresis.

My system is quick acting because it only requires the slightest amount of heat to change any of the liquid to vapor which cannot escape, when the vapor valve is closed, without forcing the residual liquid out of the evaporator by the back pressure generated. The system, while entirely self-powered in its capacity to remove heat is extremely quick responding for the reason that when the valve is closed, heat removed almost immediately falls to zero.

While the preferred embodiment utilizes a thermostatically operable valve of the solenoid type, my invention is not limited thereto, it being understood that other varieties of control valves may be employed. The term "thermostatically operable valve" as employed herein is meant to include any valve combination which operates to control the flow of fluid in a system.

Although the present invention has been described in conjunction with preferred embodiments, it is to be understood that modifications and variations may be resorted to without departing from the spirit and scope of the invention, as those skilled in the art will readily under-

What is claimed is:

1. An assembly controlling the temperature of a temperature-sensitive device and assuring optimum performance thereof over a narrow temperature range with minimum thermal hysteresis which comprises, a temperature-sensitive device the temperature of which it is desired to control an evaporator mounted in heat-conductive relationship with said temperaure-sensitive device, a condenser coupled to said evaporator via a liquid transfer line and a vapor transfer line, said condenser being in gravity feeding relationship to said evaporator via said liquid line which is connected from the condenser to said evaporator, means for resisting fluid flow in said liquid line and a thermostatically operable valve in said vapor line thermostatically associated with said temperature-sensitive device.

2. An assembly controlling the temperature of a temperature-sensitive electronic component and assuring optimum performance thereof over a narrow temperature range with minimum thermal hysteresis which comprises in combination, an electronic component the temperature of which it is desired to control, an evaporator mounted in heat-conductive relationship with said electronic component, a condenser coupled to said evaporator via a liquid transfer line and a vapor transfer line, said condenser being in contact with the ambient environment and being in gravity feeding relationship to said evaporator via the liquid line which is connected from the condenser to said evaporator, a trap coupled to said liquid line, and a thermostatically operable valve in said vapor line thermostatically associated with said electronic component.

3. An assembly controlling the temperature of a microwave generating component and assuring optimum performance thereof over a narrow temperature range with minimum thermal hysteresis which comprises in combination, a microwave generating component the temperature of which it is desired to control, an evaporator mounted in heat-conductive relationship with said microwave component, a condenser coupled to said evaporator via a liquid transfer line and a vapor transfer line, asid condenser being in contact with the ambient environment and being in gravity feeding relationship to said evaporator via the liquid line which is connected from the condenser to said evaporator, a trap coupled to said liquid line, and a thermostatically operable valve in said vapor line thermostatically associated with said microwave compact.

References Cited by the Examiner

UNITED STATES PATENTS

| | | | |
|---|---|---|---|
| 2,005,611 | 6/1935 | Carson | 62—514 X |
| 2,083,611 | 6/1937 | Marshall | 62—119 X |
| 2,453,433 | 11/1948 | Hansen | 315—38 |
| 2,875,263 | 2/1959 | Harbutovskih. | |
| 3,035,419 | 5/1962 | Wigert | 62—119 X |

MEYER PERLIN, *Primary Examiner.*